United States Patent
Prasad et al.

(10) Patent No.: US 12,552,258 B2
(45) Date of Patent: Feb. 17, 2026

(54) VEHICLE CONTROL SYSTEM AND METHOD

(71) Applicant: Transportation IP Holdings, LLC, Norwalk, CT (US)

(72) Inventors: Rekha Doddarangaiah Prasad, Warrendale, PA (US); Ajith Kuttannair Kumar, Erie, PA (US); Jeffrey John Wolff, Girard, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 181 days.

(21) Appl. No.: 18/177,870

(22) Filed: Mar. 3, 2023

(65) Prior Publication Data

US 2023/0302913 A1  Sep. 28, 2023

Related U.S. Application Data

(60) Provisional application No. 63/323,780, filed on Mar. 25, 2022.

(51) Int. Cl.
*B60L 5/00* (2006.01)
*B60L 15/20* (2006.01)

(52) U.S. Cl.
CPC ............. *B60L 5/00* (2013.01); *B60L 15/20* (2013.01)

(58) Field of Classification Search
CPC .................................. B60L 5/00; B60L 15/20
See application file for complete search history.

(56) References Cited

U.S. PATENT DOCUMENTS

| 8,027,760 | B2 | 9/2011 | Chattot |
| 10,829,104 | B2 | 11/2020 | Lavertu |
| 11,142,088 | B2* | 10/2021 | Deshpande ............ B60L 58/12 |
| 11,610,484 | B1* | 3/2023 | Willey .................. G08G 1/095 |

(Continued)

FOREIGN PATENT DOCUMENTS

| CN | 108761477 A | 11/2018 |
| CN | 110244320 A | 9/2019 |

(Continued)

OTHER PUBLICATIONS

EP1391685A1 machine translation (Year: 2005).*
Extended European Search Report for corresponding EP Application No. 23161375.3-1012 dated Sep. 4, 2023 (8 pages).

*Primary Examiner* — Todd Melton
*Assistant Examiner* — Oliver Tan
(74) *Attorney, Agent, or Firm* — K&L Gates LLP

(57) ABSTRACT

A control system includes an interface device having a body extending between a first end and a second end and that provides power to a vehicle system from an external power source. Sensors may be coupled with the interface device and detect sensor data associated with the coupling of the external power source with the interface device. A controller receives the sensor data from the sensors and determines a coupling location at which the external power source is coupled with the interface device. The coupling location may be at a first position between the first end and the second end of the interface device. The controller controls movement of the vehicle system to change the coupling location between the external power source and the interface device from the first position to a second position between the first and second ends of the body.

20 Claims, 7 Drawing Sheets

(56) References Cited

U.S. PATENT DOCUMENTS

| | | |
|---|---|---|
| 2009/0293759 A1 | 12/2009 | Schmitz |
| 2010/0256830 A1 | 10/2010 | Kressner et al. |
| 2014/0005871 A1* | 1/2014 | Saito ................... B60L 15/2036 |
| | | 701/22 |
| 2014/0110205 A1 | 4/2014 | Dronnik |
| 2014/0232191 A1* | 8/2014 | Doelling ................ B61L 27/57 |
| | | 307/42 |
| 2015/0352959 A1 | 12/2015 | Buehs et al. |
| 2021/0347264 A1* | 11/2021 | Blase ........................ B60L 5/24 |

FOREIGN PATENT DOCUMENTS

| | | | | |
|---|---|---|---|---|
| EP | 1391685 A1 * | 2/2004 | ............. | B60M 1/28 |
| SE | 1550509 A1 | 10/2016 | | |

\* cited by examiner

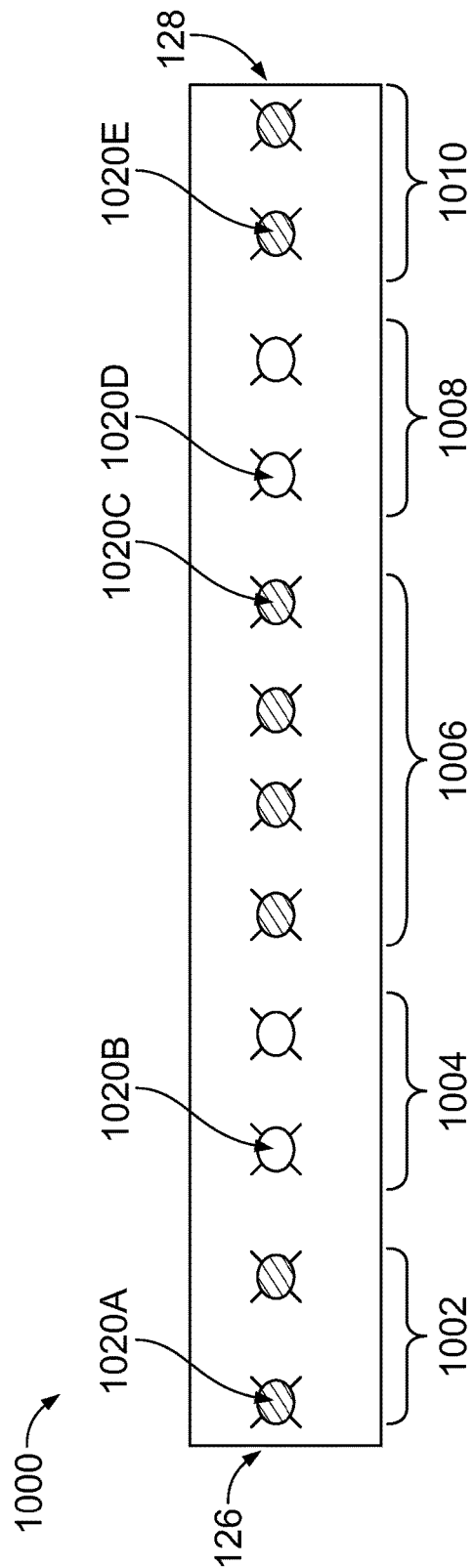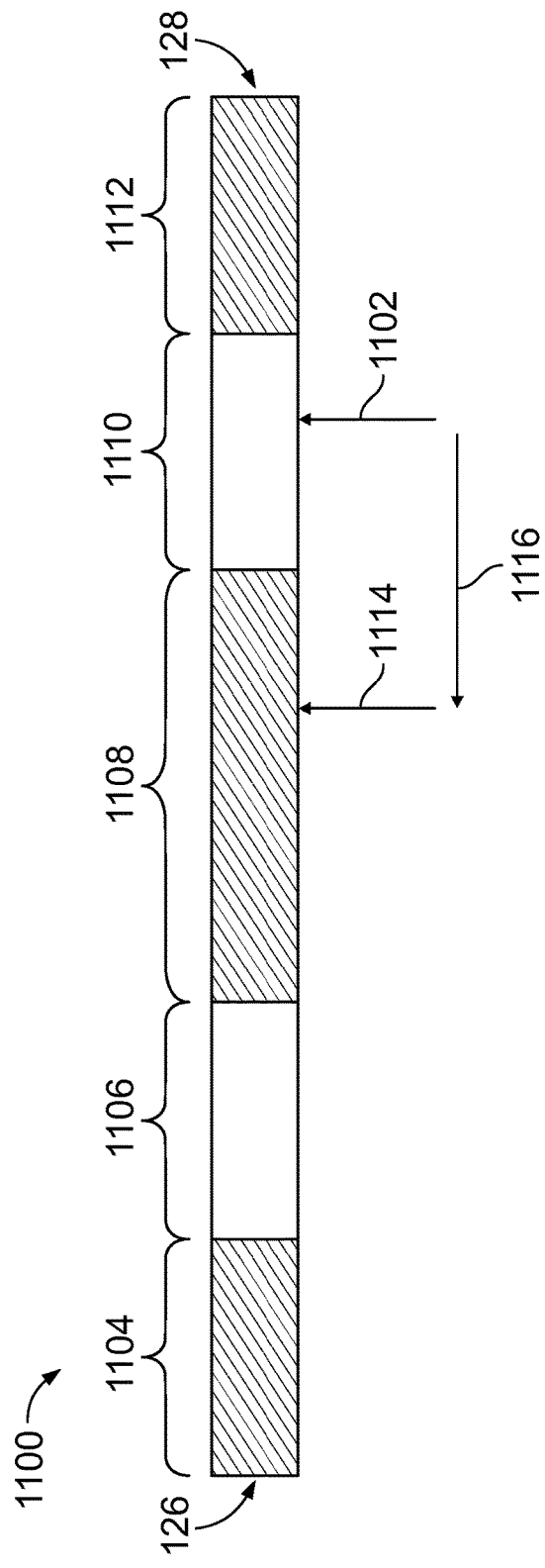

VEHICLE CONTROL SYSTEM AND METHOD

CROSS-REFERENCE TO RELATED APPLICATIONS

This application claims priority to U.S. Provisional Application No. 63/323,780, filed 25 Mar. 2022. The entirety of this application is incorporated herein by reference.

BACKGROUND

Technical Field

The subject matter described herein relates to vehicle control systems and methods.

Discussion of Art

Vehicle systems may be equipped with a pickup, or interface device, that may be used to connect with an overhead catenary line or other external power source as the vehicle system moves along the route. For example, some vehicles may include pantograph structures that may extend a distance away from the vehicle system to be coupled with the overhead catenary line. The vehicle system may receive electric power from the catenary line as the vehicle system moves along the route. The electric power may be used to propel the vehicle system, to power auxiliary systems of the vehicle system, to change a state of charge of an onboard energy storage device (e.g., a battery, or the like), or the like.

The coupling location between the catenary line and the interface device may change as the vehicle system moves along the route. For example, the vehicle system may be a haul truck that may move along a non-rail route (e.g., a paved and/or unpaved route). As the haul truck moves along the route, the coupling location between the catenary line and the interface device may change as the lateral movement of the vehicle system changes. For example, the haul truck may be steered at such an angular position that causes the haul truck to drift away from the catenary line. To maintain contact with the catenary line, and contact at a preferred location of the interface device, an operator of the vehicle system may need to monitor the coupling location between the interface device and the catenary line. In one embodiment, the operator may monitor the coupling location by visual observation of the coupling between the catenary and the interface device. The operator may look out of a window or opening of the vehicle system to observe a general position of the catenary relative to the position of the interface device. For example, the operator may be relied upon to manually determine the coupling location and/or contact pressure between the interface device and the catenary and coupling pressure, to manually ensure that the vehicle system does not drift away from the catenary line, to manually ensure there is a satisfactory amount of contact pressure between the catenary and the interface device, or the like. It may be desirable to have a system and method that differs from those that are currently available.

BRIEF DESCRIPTION

In accordance with one example or aspect, a control system includes an interface device having a body extending between a first end and a second end. The interface device may be coupled with a vehicle system and an external power source and provides power to the vehicle system from the external power source. One or more sensors may be coupled with the interface device and detect sensor data associated with the coupling of the external power source with the interface device. A controller having one or more processors receives the sensor data from the sensors and determines a coupling location at which the external power source is coupled with the interface device, in which the coupling location may be at a first position between the first end and the second end of the body of the interface device. The controller controls movement of the vehicle system to change the coupling location between the external power source and the interface device from the first position between the first and second ends of the body to a second position between the first and second ends of the body.

In accordance with one example or aspect, a method includes determining a coupling location at which an external power source is coupled with an interface device based on sensor data from one or more sensors. The interface device is coupled with the vehicle system and provides power to the vehicle system from the external power source. The interface device includes a body extending between a first end and a second end, with the coupling location being at a first position between the first and second ends of the body of the interface device. The method includes controlling movement of the vehicle system to change the coupling location between the external power source and the interface device from the first position between the first end and the second end to a second position between the first end and the second end.

In accordance with one example or aspect, a control system includes an interface device that is coupled with a vehicle system and an external power source. The interface device provides power to the vehicle system from the external power source. One or more sensors coupled with the interface device detect sensor data associated with the coupling of the external power source and the interface device. A controller having one or more processors receives the sensor data from the sensors and determines a coupling location at which the external power source is coupled with the interface device. The controller compares the coupling location with a target coupling location between the external power source and the interface device, and controls movement of the vehicle system based on the comparison of the coupling location with the target coupling location.

BRIEF DESCRIPTION OF THE DRAWINGS

The subject matter may be understood from reading the following description of non-limiting embodiments, with reference to the attached drawings, wherein below:

FIG. 10 illustrates one example of a display to an operator of a vehicle system;

FIG. 11 illustrates one example of a display to an operator of a vehicle system.

DETAILED DESCRIPTION

Figure 1:
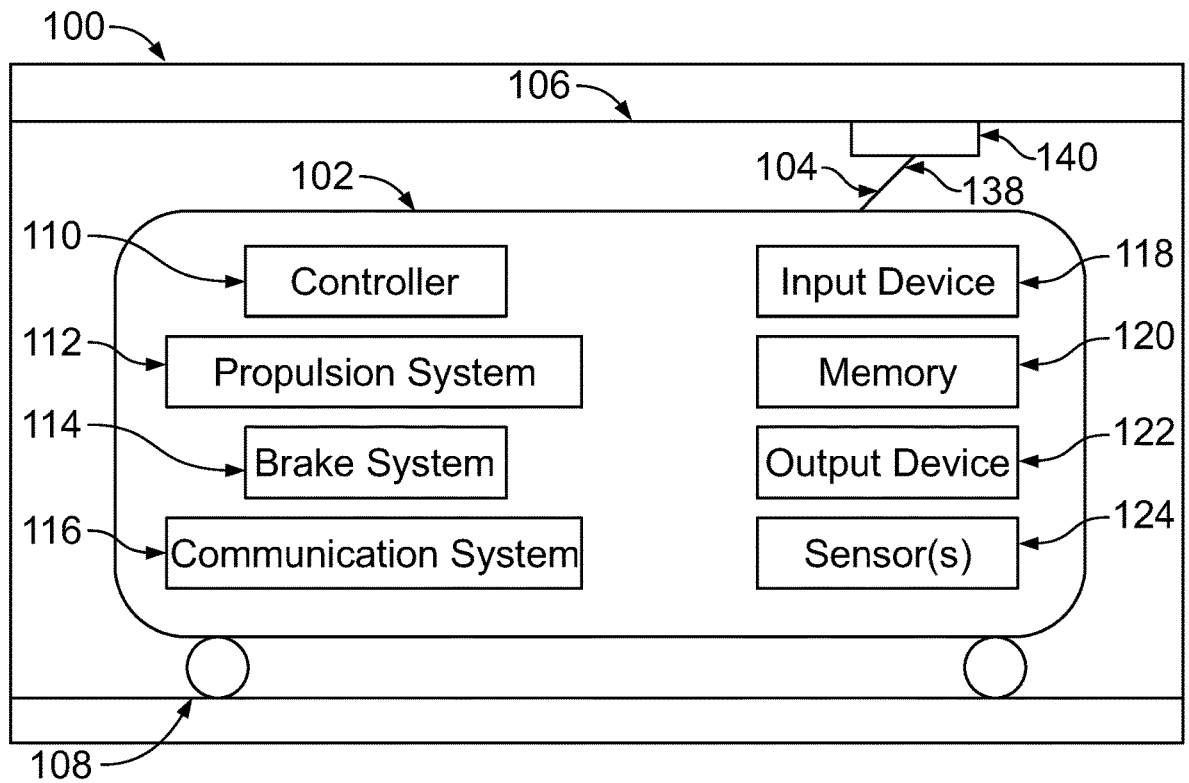
FIG. 1 illustrates a schematic of a vehicle control system in accordance with one embodiment.

Embodiments of the subject matter described herein relate to a vehicle control system and method of operation. The vehicle control system may be used to control operation of a vehicle system that includes a pickup, or interface device, that may be selectively coupled with an external power source. A suitable interface device may be a pantograph, a third rail pickup, or the like. A suitable external power source may be a catenary line, a charger, a third rail, and the like. The interface device may couple with the external power source as the vehicle system moves along the route. The vehicle system may receive electric power from the external power source. The electric power may be used to energize one or more systems of the vehicle system. These energized systems may include the propulsion system, braking system, auxiliary system, control system, and the like.

In one embodiment, the interface device may include a body that extends between a first end and a second end in a lateral direction that is substantially perpendicular to a direction of movement of the vehicle system along the route. The interface device may include one or more contact surfaces (e.g., contact strips, contact pads, bushings, or the like) to which the external power source may be coupled as the vehicle system moves along the route. The interface device may include one or more sensors that may detect sensor data associated with the coupling of the external power source with the interface device. In one embodiment, the sensor data may indicate the coupling location on the interface device between the external power source and the interface device. Optionally, the sensor data may indicate contact pressure between the external power source and the interface device. Optionally, the sensor data may indicate a length of time that the external power source is coupled with different locations of the interface device. Optionally, the sensor data may indicate a state of the plural contact surfaces of the interface device.

The sensors of the interface device may transmit the sensor data with a controller onboard the vehicle system, a controller off-board the vehicle system, a controller of a portable control system, or the like. The controller may include one or more processors that may determine the coupling location between the external power source and the interface device based on the sensor data. In one embodiment, the controller may determine whether the coupling location needs to change. The coupling location may need to change based on the coupling location being within a threshold margin distance of an edge of the interface device, being at a degraded portion of the interface device, based on a comparison of the actual coupling location and a target coupling location, or the like. In one embodiment, the controller may automatically control operation of the vehicle system to change the coupling location from a first coupling location to a second coupling location. For example, the controller may automatically change a position or setting of a steering device of the vehicle system (e.g., a steering wheel, a joystick, or the like). Changing the position of the steering device changes the lateral position of the vehicle system as the vehicle system moves along the route. Changing the lateral position of the vehicle system changes the coupling location between the external power source and the interface device. Optionally, the controller may communicate a command message to an operator of the vehicle system to manually change an operational setting of the vehicle system to change the coupling location between the external power source and the interface device.

FIG. 1 illustrates a schematic of a vehicle control system 100 in accordance with one embodiment. The vehicle control system includes a vehicle system 102 that may be a propulsion-generating vehicle. Suitable propulsion-generating vehicles may include a rail vehicle, an automobile, a truck, a bus, a mining vehicle, a marine vessel, an aircraft (manned or unmanned, such as a drone), an agricultural vehicle, or another off-highway vehicle. Suitable rail vehicles may include a locomotive, a switcher, a shunter, and the like. In the illustrated embodiment, the vehicle system includes plural wheels 120 in contact with a route along which the vehicle system moves. Optionally, the vehicle system may be a marine vessel or aircraft and may be devoid of wheels. For example, the vehicle system may move along a waterway, in a flight path, or the like. In one or more embodiments, the vehicle system may include two or more vehicles that may travel together (by being mechanically coupled or by being mechanically separate but logically coupled and communicating with each other to travel together, such as in a convoy or a locomotive consist where multiple locomotives communicate and operate together as a train). At least one vehicle of the vehicle system may be a propulsion-generating vehicle, and optionally the vehicle system may include one or more non-propulsion generating vehicles.

The vehicle system may include a controller 110 that represents hardware circuitry that includes and/or may be connected with one or more processors (e.g., one or more integrated circuits, one or more microprocessors, one or more field programmable gate arrays, etc.) that perform and/or control performance of the operations described herein. The controller may also include or be electrically coupled to one or more sensors 124. The one or more sensors may be speed sensors, propulsion based sensors, braking system based sensors, motion sensors, fuel level sensors, global positioning system based sensors, etc. that may be used to determine speed data and information, data and information related to determining fuel and/or fuel components, data and information related to throttle settings, braking settings, or notch settings, or the like.

The controller may be communicatively coupled with an off-board control system (not shown) or one or more communication systems (e.g., of other vehicle systems) via a communication system 116. The communication device represents communication circuitry, such as one or more antennas, modems, or the like, that wirelessly communicate signals.

The vehicle system includes a propulsion system 112 that may include one or more tractive components that propel the vehicle system. As one example, the propulsion system may include an engine that may be operably coupled with an alternator device, a generator device, a motor, or the like. Power from the engine may be used to propel the vehicle system to move along a route 108. In one or more embodiments, the engine may be an internal combustion engine such as a diesel or other gasoline fueled engine. Optionally, the vehicle system may include an alternative mechanical drive system that is operably coupled with the engine. The drive system may include one or more of gears, belts, hydraulics, or the like, to control the propulsion of the vehicle system to move along the route with power from the engine. The vehicle system includes a brake system 114 that may include one or more vehicle speed control devices such as air brakes, pneumatic braking systems, brake pads, or the like. The brake system may control the speed of movement of the vehicle system, such as to slow and/or stop movement of the vehicle system.

The controller may generate and communicate signals to an output device 122 (e.g., a display), to the propulsion system, and/or to the brake system of the vehicle system. The signals can be sent to the output device to present instructions or rules to an operator on how to control the vehicle according to the trip plan. The signals may be sent to the propulsion system (e.g., one or more engines, motors, or the like) and/or the braking system to allow the controller to automatically control operation of the movement of the vehicle.

In one or more embodiments, the propulsion and/or brake systems, and/or other system of the vehicle system, may be electrically powered by electric energy (e.g., electric current) supplied by one or more onboard and/or off-board power sources. For example, the vehicle system may receive electric current from an external power source 106. For example, one or more systems of the vehicle system may be electrically connected with one or more conductive pathways that extend alongside the route being traveled by the vehicle system. In the illustrated embodiment of FIG. 1, an overhead catenary may be the external power source that may supply electric energy to an interface device 104 of the vehicle system. Optionally, the vehicle system may include one or more interface devices, and each of the one or more interface devices may be electrically coupled with one or more different external power sources. In other embodiments, not shown, a suitable external power source may be a third rail, a wireless charging pad, and the like.

In one embodiment, the interface device may include a body 140 that is operably coupled with the external power source, and a coupling device 138 that couples the body of the interface device with the vehicle system. The coupling device may include mechanical coupling features that maintain a position of the body relative to the external power source. The mechanical coupling features may be capable of moving between a collapsed state (e.g., in which the body is separated from the external power source) and an extended state (e.g., in which the body is coupled with the external power source. The coupling device may also include electrical coupling features such as cables, wires, buses, or the like, that electrically couple the external power source with one or more systems or devices of the vehicle system.

The electric energy that is received through the interface device of the vehicle system may be used to charge an onboard energy storage device, power one or more systems of the vehicle system (e.g., blower motors, traction motors, braking devices, or the like), or the like. For example, a drive system of the propulsion system may be operated with energy from the external power source. In one embodiment, the interface device may be referred to as a pantograph.

Figure 2:
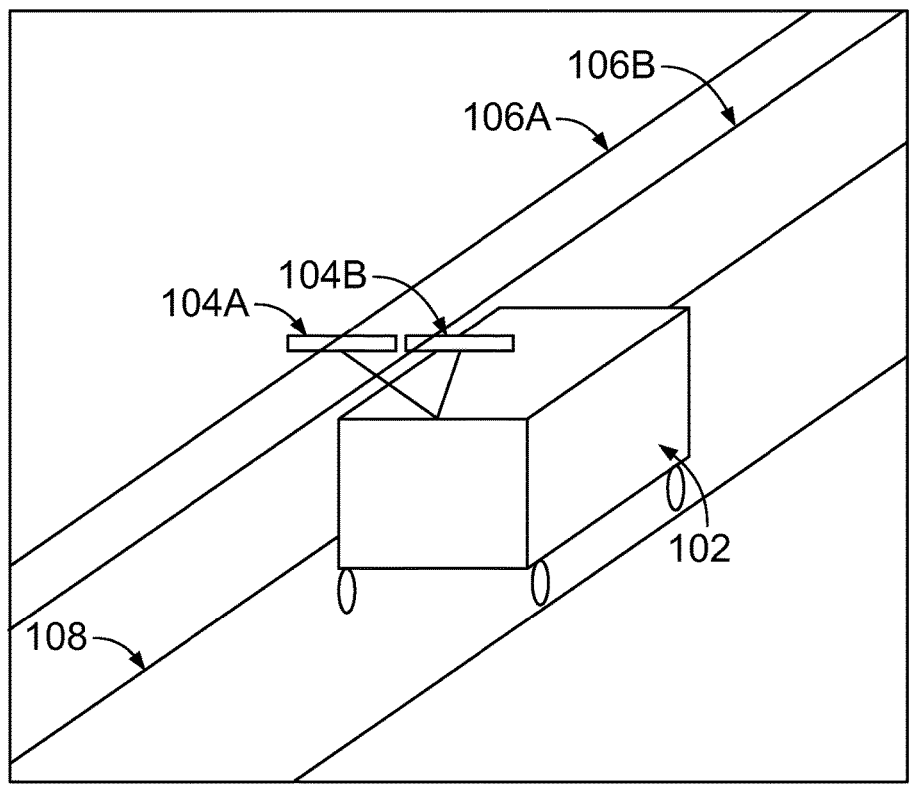
FIG. 2 illustrates a perspective view of a vehicle system of the vehicle control system shown in FIG. 1.

FIG. 2 illustrates a perspective view of the vehicle control system shown in FIG. 1. In the illustrated embodiment of FIG. 2, the vehicle system includes a first interface device 104A and a second interface device 104B. The first interface device is operably and electrically coupled with a first external power source 106A, and the second interface device is operably and electrically coupled with a second external power source 106B. Optionally, the vehicle system may include a single interface device, which may be operably and electrically coupled with a single external power source. In another embodiment, the vehicle system may include two or more interface devices, that may be electrically and operably coupled with a single external power source. In another embodiment, the vehicle system may include a single interface device, which may be operably and electrically coupled with two or more external power sources. Optionally, the vehicle system may be electrically coupled with one or more external power sources via an alternative configuration.

In one or more embodiments, the vehicle system may receive electric current from both the first external power source and the second external power source. The amount of electric energy from the first external power source may be substantially the same or different than an amount of electric energy from the second external power source. Optionally, the vehicle system may receive electric power for one of the external power sources (e.g., for a determined length of time, based on a length of distance the vehicle system has traveled along the route, based on an amount of electric current received), and may switch to receive electric power from the other external power source responsive to the vehicle system meeting the predetermined threshold (e.g., length of time traveled, distance traveled, an amount of electric current, or the like).

Figure 3:
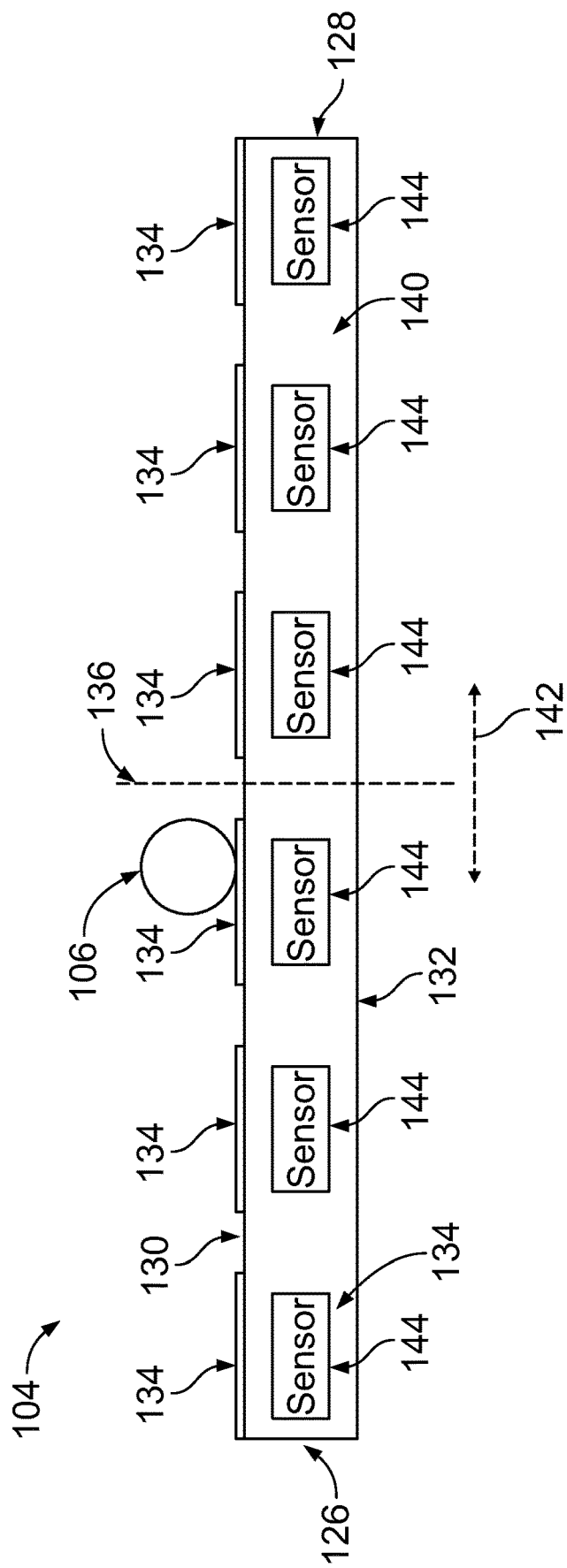
FIG. 3 illustrates a schematic of a cross-sectional front view of an interface device of a vehicle system.
Figure 4:
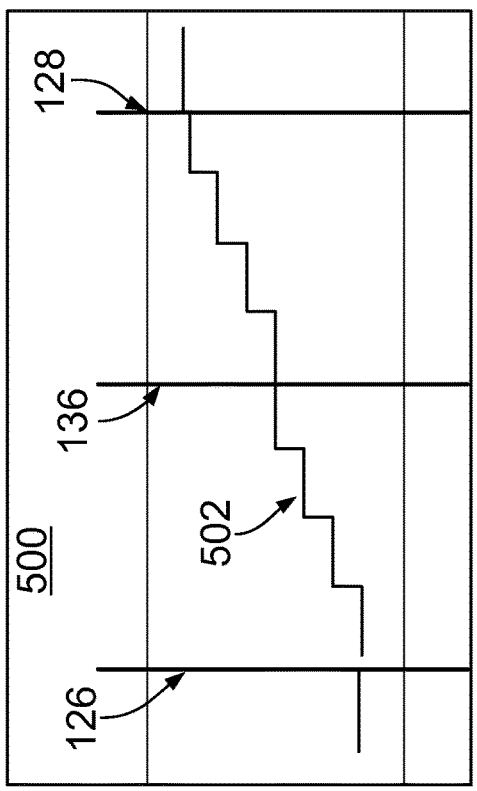
FIG. 4 illustrates a graph of one example of sensor data in accordance with one embodiment.
Figure 5:
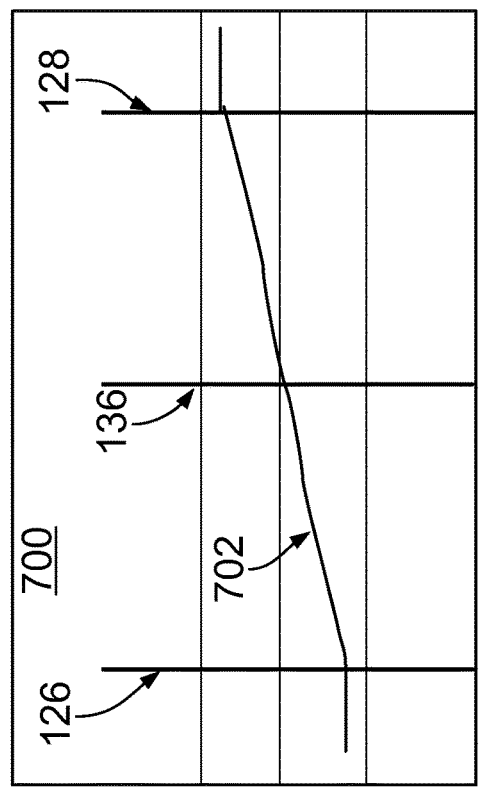
FIG. 5 illustrates a graph of one example of sensor data in accordance with one embodiment.
Figure 6:
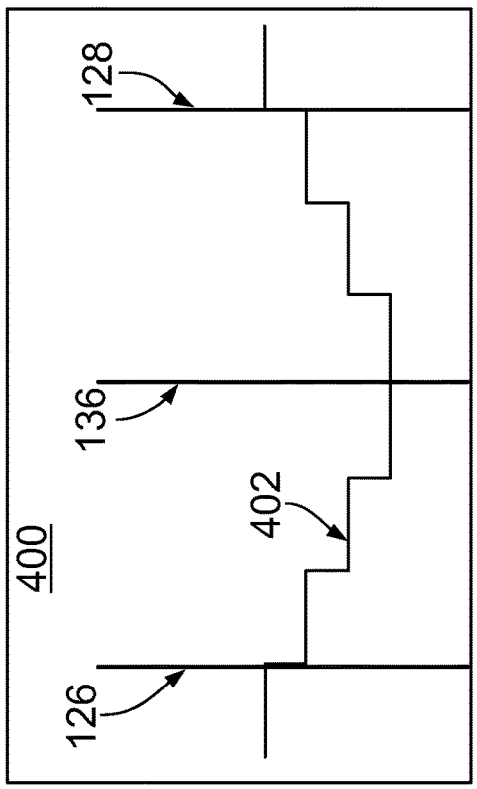
FIG. 6 illustrates a graph of one example of sensor data in accordance with one embodiment.

FIG. 3 illustrates a cross-sectional front view of the interface device in accordance with one embodiment. The body 140 of the interface device extends between a first end 126 and a second end 128, and a third surface 130 and a fourth surface 132. The body extends in a first or lateral direction 142 between the first and second ends of the body. For example, the first or lateral direction is substantially perpendicular to a direction of movement of the vehicle system along the route. The external power source 106 is coupled with the third surface of the body while the vehicle system receives electric power from the external power source. The interface device includes plural contact surfaces 134 that are disposed on the third surface of the body. In the illustrated embodiment, the interface device includes six contact surfaces that are arranged in an array between the first and second ends of the body, but optionally may include any number of contact surfaces. The contact surfaces may be one or more contact strips, pads, bushings, or the like. The external power source may be in contact with one or more of the contact surfaces as the vehicle system moves along the route.

The interface device may also include plural sensors 144 disposed at different locations between the first and second ends. In the illustrated embodiment, the interface device includes six sensors, but alternatively the interface device may include any number of sensors. In one embodiment, the interface device may include a number of contact surfaces and a same number of sensors. For example, each different contact surface may be associated with a different sensor. Optionally, the interface device may include a single sensor that may be associated with each of the plural contact surfaces. The one or more sensors may detect contact between the external power source and one or more of the contact surfaces of the interface device.

A center axis 136 extends between the third and fourth surfaces, and is substantially centered between the first and second ends. The sensors disposed on the third surface of the body, or proximate to the third surface, may detect or otherwise sense sensor data associated with a coupling position of the external power source with one of the contact surfaces, such as relative to the center axis, relative to the first end, and/or relative to the second end.

Figure 7:
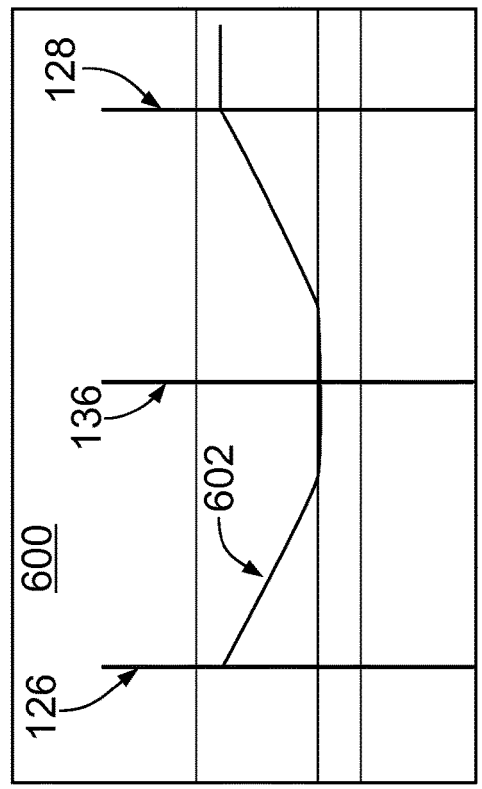
FIG. 7 illustrates a graph of one example of sensor data in accordance with one embodiment.

FIGS. 4 through 7 illustrate examples of different types of sensors that may be used to detect the position of the external power source. For example, FIG. 4 includes a graph 400 that illustrates sensor data based on the sensors being discrete unipolar sensors. The graph includes a data line 402 that extends between the first end 126 of the body, the center axis 136, and the second end 128 of the body. Alternatively, FIG. 5 includes a graph 500 that illustrates sensor data based on the sensors being discrete bipolar sensors. The graph includes a data line 502 that extends between the first end of the body, the center axis, and the second end of the body. Alternatively, the sensors may be continuous sensors. For example, FIG. 6 includes a graph 600 that illustrates sensor data based on the sensors being continuous unipolar sensors. The graph includes a data line 602 that extends between the first end of the body, the center axis, and the second end of the body. Alternatively, FIG. 7 illustrates a graph 700 that illustrates sensor data based on the sensors being continuous bipolar sensors. The graph includes a data line 702 that extends between the first end of the body, the center axis, and the second end of the body. Optionally, the interface device may include a combination of two or more different types of sensors. For example, the sensors positioned between the first end and the center axis may be discrete sensors, and the sensors positioned between the center axis and the second end may be continuous sensors.

Returning to FIG. 3, the sensors may detect the sensor data indicative of the position of the external power source between the first and second ends of the body. Optionally, the sensors may include or be pressure sensors, and may detect an amount of contact the external power source is making with the third surface of the interface device. For example, the sensors may detect sensor data associated with the position of the body of the interface device between the vehicle system and the external power source, a contact pressure between the interface device and the external power source, or the like.

The controller of the vehicle system may receive the sensor data indicative of the position of the external power source relative to the first and second ends of the body. The controller may automatically control lateral movement of the vehicle system based on the position of the external power source. For example, the controller may change a position of a steering device (e.g., a steering wheel, joystick, or the like) to change an angular direction of movement of the vehicle system. Changing the lateral movement of the vehicle system of the angular direction of movement of the vehicle system changes the coupling position between the external power source and the interface device in a lateral direction 142. In one embodiment, the controller may determine that the external power source is coupled with the body at a location that is proximate the first end of the body, but needs to change to a different coupling position. The controller may automatically control the lateral position of the vehicle system (e.g., steer the vehicle system in a different direction) to move the coupling location between the external power source and the body to a new coupling location that is between the first end and the center axis and proximate to the center axis. For example, controlling the lateral movement of the vehicle system changes the coupling location between the external power source and the interface device.

In one embodiment, the lateral movement of the vehicle system may be automatically controlled to control the coupling position based on the vehicle system drifting away from external power source. For example, the vehicle system may be positioned and moving along the route such that the coupling position between the external power source and the interface device is drifting (e.g., continuously drifting) from the center axis toward the second end of the body. For example, without correction of the lateral movement of the vehicle system, the external power source may be decoupled or may separate from the body if the vehicle system continues to drift. Decoupling the external power source from the interface device while the vehicle system is moving along the route may cause the vehicle system to fail, to slow or halt movement, or the like.

In one or more embodiments, the controller may receive sensor data indicative of a contact pressure between the interface device and the external power source. For example, one or more of the sensors may be and/or include pressure sensors that may detect an amount of pressure between the external power source and the interface device. In one embodiment, the controller may determine that the amount of contact pressure is below a target pressure threshold or above a target pressure threshold, and may automatically change a position of the coupling device of the interface device, such as to move the interface device further away from the vehicle system or closer toward the vehicle system.

Figure 8:
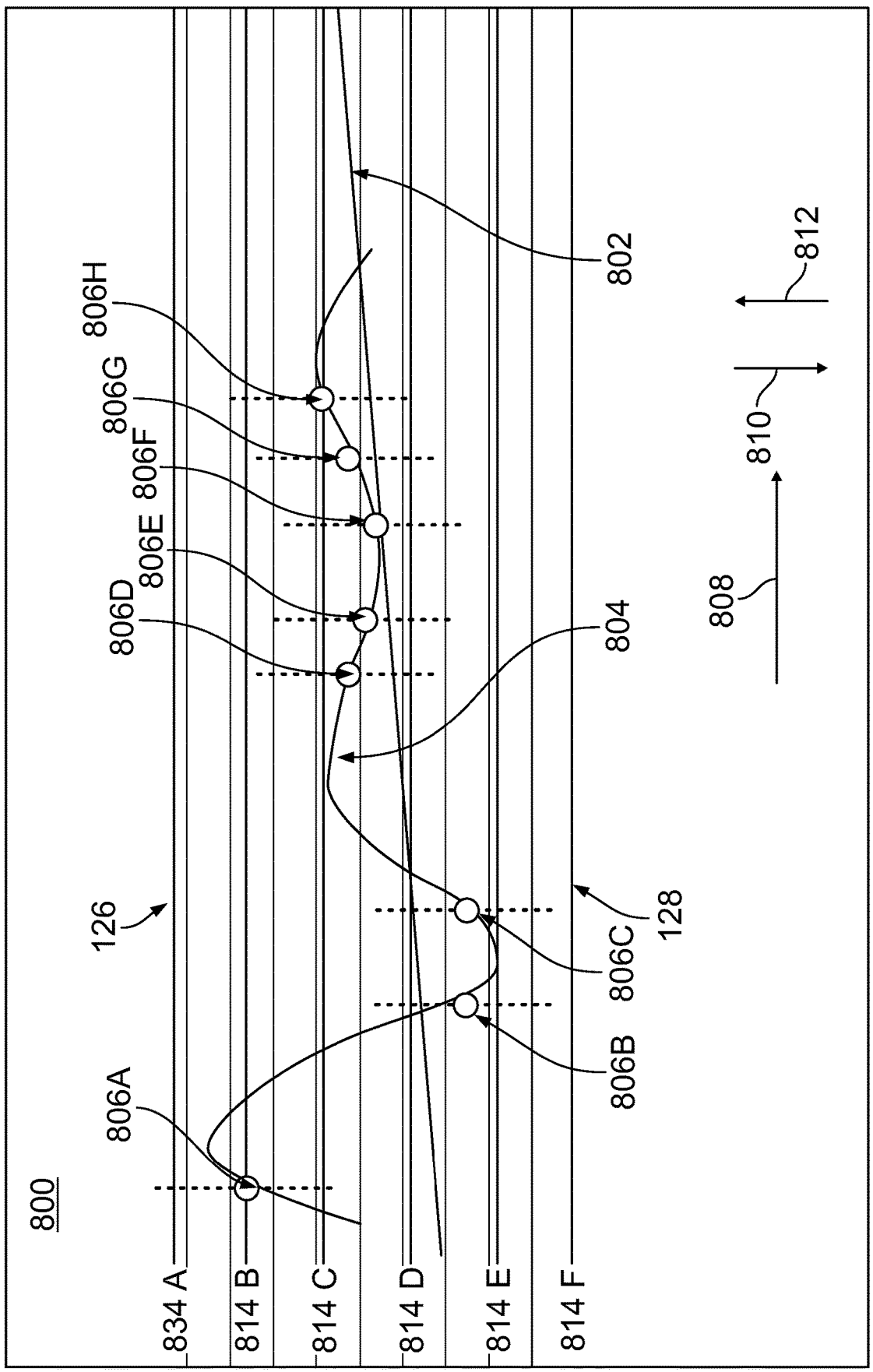
FIG. 8 illustrates an illustration of a guidance system of a vehicle system in accordance with one embodiment.

In another embodiment, the lateral movement of the vehicle system may be automatically controlled to control the coupling position based on a target coupling location. For example, FIG. 8 illustrates one example of a guidance system 800 of the vehicle system. The guidance system may indicate the coupling position between the external power source and the interface device relative to the first and second ends of the interface device. In one embodiment, the guidance system may be displayed to the operator of the vehicle system via the output device. Optionally, the guidance system may be displayed to a remote control system, such as an off-board control system, a back-office server, or the like.

The guidance system graph includes plural horizontal lines 814A-F that may indicate placement of each of the different sensors of the array of sensors disposed on the third surface of the interface device. Optionally, the plural horizontal lines may represent plural contact surfaces disposed on the third surface of the body. The graph includes a data line 804 indicating an actual coupling location between the external power source and the interface device, with plural data points 806A-H indicating the plural different coupling positions as the vehicle system moves in a direction of movement 808.

The graph also includes a target coupling position data line 802. For example, the target coupling position data line may indicate predetermined target coupling locations between the external power source and the interface device while the vehicle moves in the direction of movement along the route. The target coupling location may move between the first and second ends of the body as the vehicle system moves along the route. The controller may receive the sensor data from each of the plural sensors indicative of the coupling position between the external power source and the interface device. The controller may compare the sensor data (e.g., indicative of the actual coupling position) with the target coupling position data, and determine how to control movement of the vehicle system to move the actual coupling location toward the target coupling location based on the comparison between the actual coupling position and the target coupling location.

As one example, the controller may receive the sensor data indicative of the external power source being coupled with the interface device at a first coupling position 806A. The controller may determine that the vehicle system needs to be controlled to move in a first lateral direction 810 (e.g., toward the second end of the body) to move the first coupling position toward the target coupling location. As another example, the controller may receive the sensor data indicative of the external power source being coupled with the interface device at a second coupling position 806B, and may determine that the vehicle system needs to be controlled to move in a second lateral direction 812 (e.g., toward the first end of the body) to move the second coupling position toward the target coupling location. The controller may automatically control one or more operational settings of the vehicle system to move the actual coupling positions toward the target coupling locations as the vehicle system moves along the route. For example, the controller may control operation of the vehicle system without input from an operator onboard the vehicle system, or a remote operator disposed off-board the vehicle system.

In one or more embodiments, the controller may communicate an alert to an operator of the vehicle system (e.g., onboard and/or off-board the vehicle system) based on a distance between the actual coupling position and the target coupling location. Optionally, the controller may communicate an alert responsive to determining that the actual coupling position is within a determined threshold margin distance of the first or second ends of the body. For example, the controller may determine that the actual coupling position is too close to the first end of the body (e.g., within the threshold margin distance), and may communicate an alert to an operator of the system. In one or more embodiments, the controller may automatically implement a corrective action such as control movement of the vehicle system to move in the lateral direction away from the first end of the body, slow or stop movement of the vehicle system (e.g., to ensure the interface device does not become separated or disconnected from the external power source), or the like, responsive to determining that the actual coupling position is within the determined threshold margin distance away from the first or second ends of the body. Optionally, the alert may include a communicate command message to an operator of the vehicle system (e.g., onboard and/or off-board the vehicle system). The command message may include operational settings for the operator to manually change movement of the vehicle system to change the coupling location between the external power source and the interface device, such as from a first coupling position to a second coupling position. The command message may instruct the operator to slow or stop movement of the vehicle system, to change a direction of steering of the vehicle system, or the like.

Figure 9:
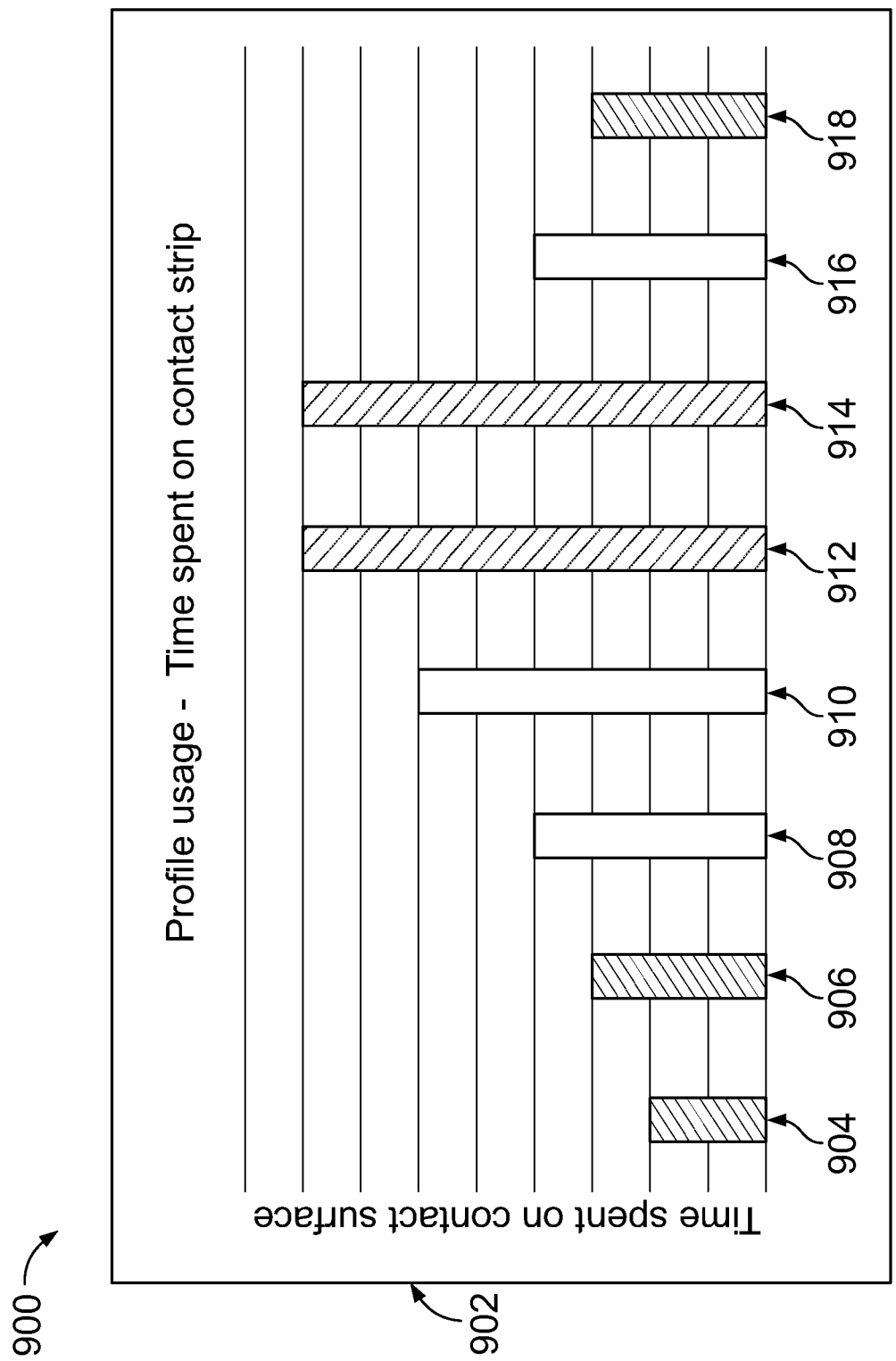
FIG. 9 illustrates a bar graph illustrating usage of an interface device of a vehicle system in accordance with one embodiment.

In one or more embodiments, the coupling position may be controlled based on an amount of time the external power source is coupled with one or more contact surfaces of the interface device. For example, FIG. 9 illustrates a graph 900 indicating usage of the interface device of the vehicle system. A vertical axis 902 represents an amount of time of contact with the external power source. The graph includes plural bars 904-918 indicating each of the plural different contact surfaces disposed on the third surface of the interface device. For example, the external power source may be in contact with a fifth contact surface 912 and a sixth contact surface 914 for a length or amount of time that is greater than an amount of time the external power source is in contact with the other contact surfaces. The external power source may be in contact with a first contact surface 904 for a least amount of time relative to each other contact surface.

In one or more embodiments, the controller may receive data indicative of an amount of time the external power source is in contact with each contact surface on the third surface of the interface device. The controller may determine that the coupling position between the external power source and the third surface may need to change based on an amount of time the external power source has been in contact with different portions of the third surface, based on a state of different portions of the interface device, or the like. As one example, one contact surface, or at least a portion of the third surface of the interface device, may be degraded to a level that is greater than a level of degradation of one or more other contact surfaces based on the sensor data received from the one or more sensors. The controller may determine that the external power source has been in contact with the degraded contact surface, or a degraded portion of the third surface, for a length of time that exceeds a determined threshold. Optionally, the controller may determine that the external power source should not be in contact with the degraded contact surface. The controller may initiate a change to the lateral movement of the vehicle to change the coupling position to a different, less degraded contact surface. The controller may initiate the change automatically, in one embodiment.

In one or more embodiments, the controller may receive data indicative of one or more arc profiles between the external power source and the interface device. As one example, the arc profile may indicate a catenary wire position versus a number of times an arc has occurred at that position. As another example, the arc profile may indicate a catenary wire position relative to an arc incident where energy and/or arcing occurred at that position. Optionally, the arc profile may indicate other information or data associated with arcing, wear of the external power source (e.g., catenary line), an amount of use of the external power source (e.g., historical data), or the like. The controller may compare the one or more arc profiles with a contact force profile of the external power source relative to the interface device to determine a wear profile. For example, the contact force profile may indicate a position of the catenary wire versus an average contact force and/or pressure onto the interface device at the current contact position between the interface device and the external power source. In one or more embodiments, the wear profile may indicate a position of the external power source relative to an anticipated or expected thickness of the external power source (e.g., the catenary wire). Optionally, the wear profile may indicate annunciation levels based on a wear profile of the external power source. For example, the annunciation level may indicate an expected remaining life of the external power source, an expectation of when the external power source may fail or reach a threshold level of degradation, or the like.

FIG. 10 illustrates one example of a display 1000 to an operator of the vehicle system. The display may be displayed to an operator onboard the vehicle system (e.g., via the output device), to an operator off-board the vehicle system, or the like. In the illustrated embodiment, the display includes plural icons 1020A-E that have different colors associated with each icon. The icons 1020A of a first group 1002 may represent contact surfaces disposed proximate to the first end of the body, the icons 1020B of a second group 1004 may represent contact surfaces between the first end and a center of the body, the icons 1020C of a third group 1006 may represent contact surfaces disposed about the center of the interface device (e.g., between the first and second ends), the icons 1020D of a fourth group 1008 may represent contact surfaces disposed between the second end and the center of the body, and the icons 1020E of a fifth group 1010 may represent the contact surfaces disposed proximate to the second end of the body.

In the illustrated embodiment, the icons of the first and fifth group are shown as red, the icons of the second and fourth groups are shown as yellow, and the icons of the third group are shown as green. For example, the green icons may indicate an acceptable or more preferred coupling position between the external power source and the interface device. Alternatively, the red icons may indicate an unacceptable, or less preferred coupling position between the external power source and the interface device. The controller may automatically control operation of the vehicle system to change the coupling position from a coupling position indicated by an icon of the first or fifth groups to a coupling position indicated by an icon of the third group.

In one or more embodiments, one or more of the icons may be lit, highlighted, or otherwise indicate a current coupling position between the external power source and the third surface with the operator of the vehicle system. For example, one of the icons of the first group 1002 may be lit up, brighter than the other icons, may include an audio noise such as a beep, alarm, or the like, to indicate that the external power source is coupled with one of the contact surfaces disposed proximate the first end. Optionally, the display to the operator may change based on an amount of time the external power source has been in contact with one of the contact surfaces. For example, the brightness of the icon may change (e.g., continuously, as step changes, or the like) after the external power source has continuously been in contact with one of the contact surfaces for 2 minutes, for 10 minutes, for 30 minutes, or the like. Optionally, an audio alert may sound responsive to the external power source being in contact with one of the contact surfaces for a determined length of time.

FIG. 11 illustrates another example of a display 1100 to an operator of the vehicle system. The display includes plural sections 1104-1112 that indicate plural different sections of the interface device between the first end and the second end of the body. A first section 1104 may represent a designated threshold margin distance away from the first end that the coupling position is to be, and a fifth section 1112 may represent a designated margin threshold distance away from the second end that the coupling position is to be. In the illustrated embodiment, the external power source is coupled with the interface device at a first coupling position 1102. The coupling position may be about 0.5 meters from the second end of the body. The controller may determine that the coupling position needs to move in a lateral direction 1116 to a second coupling position 1114. The controller may automatically control operation of the vehicle system, such as to change an angular position of a steering device of the vehicle system, to change the coupling position from the first coupling position to the second coupling position. Optionally, the controller may communicate a command message to an operator of the vehicle system to manually change an angular position of the steering device of the vehicle system to change the coupling position between the external power source and the interface device.

Figure 12:
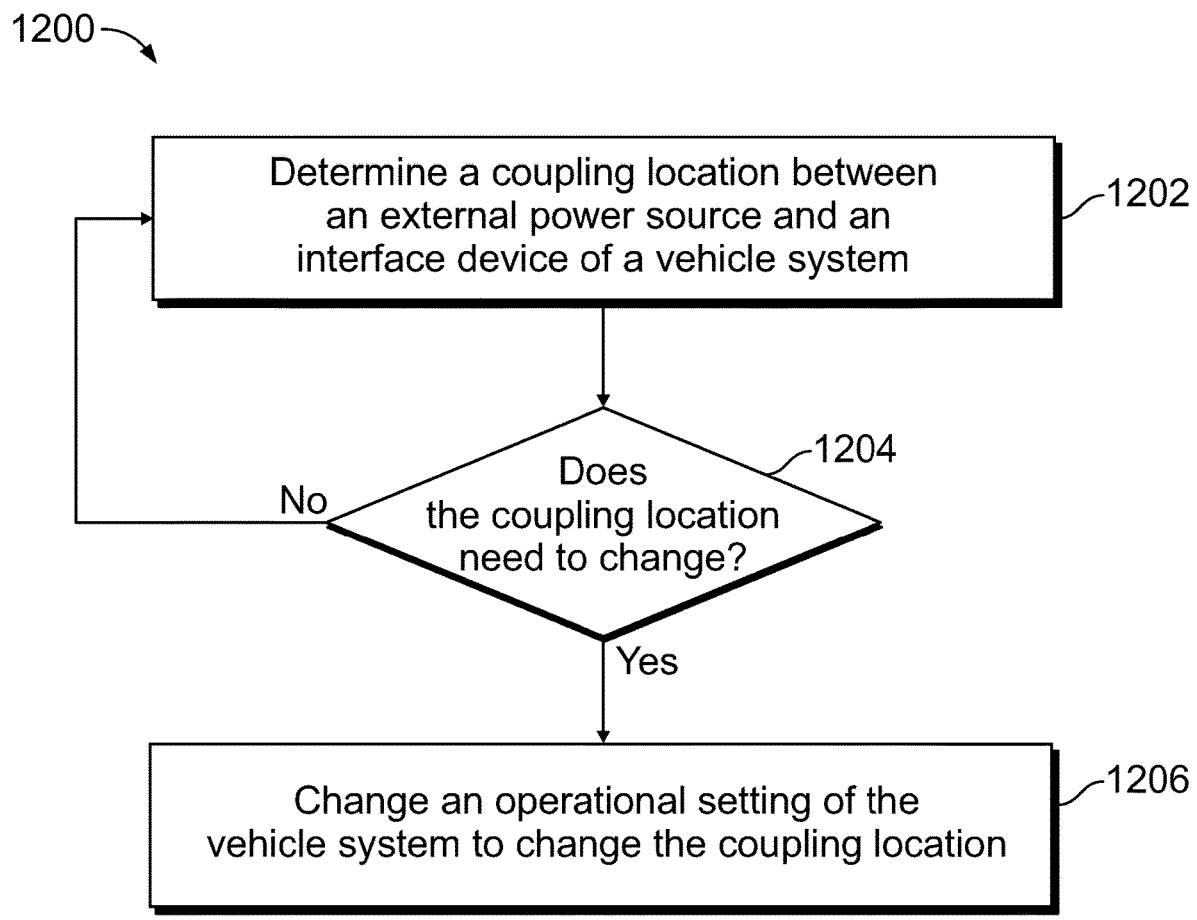
FIG. 12 illustrates a flowchart of a method of controlling operation of a vehicle system in accordance with one embodiment.

FIG. 12 illustrates a flowchart 1200 of one example of a method for controlling a vehicle system. The vehicle system may include an interface device, such as a pantograph, coupled with the vehicle system that is coupled with an external power source, such as an electric charging station, to receive electrical power from the external power source. One or more systems of the vehicle system may be powered by the electrical power received from the external power source. Optionally, the external power source may direct electric current to an energy storage device disposed onboard the vehicle system. A suitable energy storage system may include a battery, an ultracapacitor, or the like.

At step 1202, a coupling location between the external power source and the interface device may be determined. The coupling location may be at a position or location between first and second ends of a body of the interface device. The interface device may include one or more contact surfaces such as contact strips, contact pads, bushings, or the like, and one or more sensors that may detect contact between the external power source and the contact surfaces of the interface device. The sensors may transmit sensor data to a controller of the vehicle system. The sensor data may be associated with the coupling location between the external power source and the interface device.

At step 1204, the controller may determine whether the coupling location needs to change. In one embodiment, the coupling location may need to change based on the coupling location being within a threshold margin distance of one end of the interface device. For example, the external power source may be coupled with the interface device at a location that is determined to be too close to an edge or end of the interface device. Optionally, the coupling location may need to change based on a predetermined target coupling location. For example, the external power source may be coupled with the interface device at a target coupling location. The target coupling location may move or change to different locations between the first and second ends of the interface device as the vehicle system moves along a route. Optionally, the coupling location may need to change based on a state of a portion of the contact surface of the interface device. For example, a portion of the contact surface may be determined to be degraded, such as a to have a level of degradation that is greater than a level of degradation of another portion of the contact surface. The controller may determine that the coupling location may need to change to a different position, such as to a less degraded portion of the contact surface of the interface device. Optionally, the coupling location may need to change for an alternative reason.

If the coupling location does not need to change, flow of the method returns to step 1202, and the coupling location is again determined as the vehicle system moves along the route. Alternatively, if the coupling location does need to change, flow of the method proceeds toward step 1206. At step 1206, the controller of the vehicle system (e.g., an onboard controller, an off-board controller, a portable controller, or the like) may automatically control an operational setting of the vehicle system to change the coupling location between the external power source and the interface device. In one embodiment, the controller may automatically change a position of a steering device (e.g., a steering wheel, a joystick, or the like) that controls an angular direction of movement of the vehicle system. The controller may change the position of the steering device to change the lateral movement of the vehicle system. Changing the lateral movement of the vehicle system changes the coupling location between the external power source and the interface device. Optionally, the controller may determine that movement of the vehicle system may need to slow or stop based on the coupling location. For example, the controller may determine that the coupling location is within the designated threshold margin distance, and may automatically control operation of the vehicle system to slow movement or stop movement of the vehicle system based on the coupling location being within the threshold margin distance.

In one or more embodiments, the controller may communicate a command message to an operator of the vehicle system. The command message may include instructions for the operator to manually change an operational setting of the vehicle system to change the coupling location between the external power source and the interface device. In one embodiment, the command message may indicate an angular position at which to move the steering device to, a new speed at which the vehicle system is to move along the route, a new brake setting of the vehicle system, or the like.

In one or more embodiments, flow of the method may continue while the vehicle system moves along the route, while the interface device receives electric power from the external power source, or the like.

The controller may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one embodiment, the system may include an alignment device that supports and can move the vehicle system. The controller may signal to the alignment device to transport the vehicle system into a determined alignment with the external power source. In a particular use case, the interface device is a pantograph and the external power source is an overhead charging station. The vehicle system may approach the charging station and rest on the alignment device. The controller determines if the contact pads on the charging station are desirably aligned with the pantograph, and if not, then the alignment device moves the vehicle system (rather than the vehicle system moving itself) into the desired alignment.

In accordance with one example or aspect of the subject matter described herein, a control system includes an interface device having a body extending between a first end and a second end. The interface device may be coupled with a vehicle system and an external power source and provides power to the vehicle system from the external power source. One or more sensors may be coupled with the interface device and detect sensor data associated with the coupling of the external power source with the interface device. A controller having one or more processors receives the sensor data from the sensors and determines a coupling location at which the external power source is coupled with the interface device, in which the coupling location may be at a first position between the first end and the second end of the body of the interface device. The controller controls movement of the vehicle system to change the coupling location between the external power source and the interface device from the first position between the first and second ends of the body to a second position between the first and second ends of the body.

The controller may control lateral movement of the vehicle system to change the coupling location from the first position to the second position. The body of the interface device may extend in a first direction between the first end and the second end, where the first direction is perpendicular to a direction of movement of the vehicle system along the route. The one or more sensors may be disposed at different positions along the first direction between the first end and the second end of the body of the interface device. The one or more sensors may be arranged in an array in the first direction between the first end and the second end of the body. The controller may communicate an alert responsive to determining that the coupling location is within a threshold margin distance of one of the first end or the second end of the body of the interface device. The controller may automatically change an operational setting of the vehicle system responsive to determining that the coupling location is within a threshold margin distance of one of the first end or the second end of the body of the interface device. The controller may communicate a command message to an operator of the vehicle system. The command message may include operational settings for changing movement of the vehicle system to change the coupling location from the first position to the second position. The controller may compare the coupling location with a target coupling location between the external power source and the interface device. The controller may control movement of the vehicle system based on the comparison of the coupling location and the target coupling location. The target coupling location may move between the first end and the second end of the body of the interface device as the vehicle system moves along the route. The controller may determine a state of at least a portion of the interface device based on the sensor data received from at least one of the one or more sensors. The controller may control movement of the vehicle system to change the coupling location from the first position to the second position based on the state of the at least the portion of the interface device. The vehicle system may include an output device that may display the coupling location between the external power source and the interface device relative to the first end and the second end of the body of the interface device.

In accordance with one example or aspect of the subject matter described herein, a method includes determining a coupling location at which an external power source is coupled with an interface device based on sensor data from one or more sensors. The interface device is coupled with the vehicle system and provides power to the vehicle system from the external power source. The interface device includes a body extending between a first end and a second end, with the coupling location being at a first position between the first and second ends of the body of the interface device. The method includes controlling movement of the vehicle system to change the coupling location between the external power source and the interface device from the first position between the first end and the second end to a second position between the first end and the second end.

The method may include determining that the coupling location is within a threshold margin distance of one of the first end or the second end of the body, and communicating an alert responsive to determining that the coupling location is within the threshold margin distance. The method may include determining that the coupling location is within a threshold margin distance of one of the first end or the second end of the body, and automatically changing an operational setting of the vehicle system responsive to determining that the coupling location is within the threshold margin distance. The method may include comparing the coupling location with a target coupling location between the external power source and the interface device, and controlling movement of the vehicle system based on the comparison of the coupling location and the target coupling location. The method may include determining a state of at least a portion of the interface device based on the sensor data received from at least one of the one or more sensors, and controlling movement of the vehicle system based on the state of the at least the portion of the interface device.

In accordance with one example or aspect of the subject matter described herein, a control system includes an interface device that is coupled with a vehicle system and an external power source. The interface device provides power to the vehicle system from the external power source. One or more sensors coupled with the interface device detect sensor data associated with the coupling of the external power source and the interface device. A controller having one or more processors receives the sensor data from the sensors and determines a coupling location at which the external power source is coupled with the interface device. The controller compares the coupling location with a target coupling location between the external power source and the interface device, and controls movement of the vehicle system based on the comparison of the coupling location with the target coupling location.

The controller may determine a difference between the coupling location and the target coupling location based on the comparison of the coupling location with the target coupling location, and may communicate an alert responsive to determining that the difference between the coupling location and the target coupling location exceeds a determined threshold.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A control system comprising:
   an interface device including a body extending between a first end and a second end, the interface device configured to be coupled with a vehicle system and an external power source, the interface device configured to provide power to the vehicle system from the external power source;
   one or more sensors operably coupled with the interface device, the one or more sensors configured to detect sensor data associated with the coupling of the external power source with the interface device; and
   a controller configured to:
      receive the sensor data from the one or more sensors;
      determine a coupling location at which the external power source is coupled with the interface device, the coupling location being at a first position between the first end and the second end of the body of the interface device;
      determine a degraded portion of the interface device; and
      control movement of the vehicle system to change the coupling location between the external power source and the interface device from the first position between the first and second ends of the body to a second position between the first and second ends of the body based on a determination that the external power source has been in contact with the degraded portion of the interface device for an amount of time exceeding a determined threshold.

2. The control system of claim 1, wherein the controller is configured to control lateral movement of the vehicle system to change the coupling location from the first position to the second position.

3. The control system of claim 1, wherein the body of the interface device extends in a first direction between the first end and the second end, wherein the first direction is perpendicular to a direction of movement of the vehicle system along the route.

4. The control system of claim 3, wherein the one or more sensors are disposed at different positions along the first direction between the first end and the second end of the body of the interface device.

5. The control system of claim 3, wherein the one or more sensors are arranged in an array in the first direction between the first end and the second end of the body.

6. The control system of claim 1, wherein the controller is configured to automatically change an operational setting of the vehicle system responsive to determining that the coupling location is within a threshold margin distance of one of the first end or the second end of the body of the interface device.

7. The control system of claim 1, wherein the controller is configured to communicate a command message to an operator of the vehicle system, the command message including operational settings for changing movement of the vehicle system to change the coupling location from the first position to the second position.

8. The control system of claim 1, wherein the controller is configured to compare the coupling location with a target coupling location between the external power source and the interface device, the controller configured to control movement of the vehicle system based on the comparison of the coupling location and the target coupling location.

9. The control system of claim 8, wherein the target coupling location is configured to move between the first end and the second end of the body of the interface device as the vehicle system moves along the route.

10. The control system of claim 1, wherein the controller is configured to determine a state of at least a portion of the interface device based on the sensor data received from at least one of the one or more sensors.

11. The control system of claim 10, wherein the controller is configured to control movement of the vehicle system to change the coupling location from the first position to the second position based on the state of the at least the portion of the interface device.

12. The control system of claim 1, wherein the vehicle system includes an output device configured to display the coupling location between the external power source and the interface device relative to the first end and the second end of the body of the interface device.

13. The control system of claim 1, wherein the controller is configured to communicate an alert responsive to determining that the coupling location is within a threshold margin distance of one of the first end or the second end of the body of the interface device.

14. A method comprising:
   determining a coupling location at which an external power source is coupled with an interface device based on sensor data from one or more sensors, the interface device coupled with a vehicle system and configured to provide power to the vehicle system from the external power source, the interface device comprising a body extending between a first end and a second end, the coupling location being at a first position between the first end and the second end of the body of the interface device;
   determining a degraded portion of the interface device; and
   controlling movement of the vehicle system to change the coupling location between the external power source and the interface device from the first position between the first end and the second end to a second position between the first end and the second end based on a determination that the external power source has been in contact with the degraded portion of the interface device for an amount of time exceeding a determined threshold.

15. The method of claim 14, further comprising:
   determining that the coupling location is within a threshold margin distance of one of the first end or the second end of the body; and
   automatically changing an operational setting of the vehicle system responsive to determining that the coupling location is within the threshold margin distance.

16. The method of claim 14, further comprising:
   comparing the coupling location with a target coupling location between the external power source and the interface device; and controlling movement of the vehicle system based on the comparison of the coupling location and the target coupling location.

17. The method of claim 14, further comprising:
determining a state of at least a portion of the interface device based on the sensor data received from at least one of the one or more sensors; and
controlling movement of the vehicle system based on the state of the at least the portion of the interface device.

18. The method of claim 14, further comprising:
determining that the coupling location is within a threshold margin distance of one of the first end or the second end of the body; and
communicating an alert responsive to determining that the coupling location is within the threshold margin distance.

19. A control system comprising:
an interface device configured to be coupled with a vehicle system and an external power source, the interface device configured to provide power to the vehicle system from the external power source;
one or more sensors operably coupled with the interface device, the one or more sensors configured to detect sensor data associated with the coupling of the external power source and the interface device; and
a controller configured to:
receive the sensor data from the one or more sensors;
determine a coupling location at which the external power source is coupled with the interface device;
determine a degraded portion of the interface device; and
control movement of the vehicle system based on a determination that the external power source has been in contact with the degraded portion of the interface device for an amount of time exceeding a determined threshold.

20. The control system of claim 19, wherein the controller is configured to:
determine a difference between the coupling location and the target coupling location based on the comparison of the coupling location with the target coupling location; and
communicate an alert responsive to determining that the difference between the coupling location and the target coupling location exceeds a determined threshold.

\* \* \* \* \*